US006054089A

United States Patent [19]

Lupke et al.

[11] Patent Number: 6,054,089

[45] Date of Patent: Apr. 25, 2000

[54] METHOD AND APPARATUS OF COOLING PRODUCT WITHIN A MOLD

[76] Inventors: Manfred A. A. Lupke, 92 Elgin Street, Thornhill, Ontario, Canada, L3T 1W6; Stefan A. Lupke, 32 Vintage Lane, Thornhill, Ontario, Canada, L3T 1X6

[21] Appl. No.: 09/037,912

[22] Filed: Mar. 9, 1998

Related U.S. Application Data

[63] Continuation of application No. 08/815,603, Mar. 12, 1997, abandoned.

[51] Int. Cl.$^{7}$ .................................................... B29C 47/88

[52] U.S. Cl. .......................... 264/348; 264/508; 264/568; 264/573; 425/326.1; 425/446

[58] Field of Search .................................... 264/508, 567, 264/568, 209.3, 209.4, 573, 348, 210.1; 425/388, 532, 396, 326.1, 445, 446

[56] References Cited

U.S. PATENT DOCUMENTS

| | | | |
|---|---|---|---|
| 4,226,580 | 10/1980 | Lupke et al. | 425/326.1 |
| 4,492,551 | 1/1985 | Hegler et al. | 425/326.1 |
| 5,525,289 | 6/1996 | Lupke et al. | 264/508 |

*Primary Examiner*—Mathieu D. Vargot

[57] ABSTRACT

A method of forming a plastic product comprises extruding molten plastic into a mold having a mold wall with product shaping interior face. After shaping the product in the mold, the method includes introducing gas via a gas inlet through the mold wall onto the product to cool both the product and the mold and then discharging the gas from the mold at a location remote from the gas inlet.

4 Claims, 7 Drawing Sheets

1
2
3
4
5
P 2
1
5
3
4
P

METHOD AND APPARATUS OF COOLING PRODUCT WITHIN A MOLD

This application is a continuation of Ser. No. 08/815,603, filed Mar. 12, 1997, now abandoned.

FIELD OF THE INVENTION

The present invention relates to a method of molding a product including the step of cooling the product while the product is in the mold while at the same time cooling the mold. The invention is particularly used for the formation of molded plastic pipe.

BACKGROUND OF THE INVENTION

Plastic pipe is generally formed by extruding plastic into a mold tunnel. The pipe is formed by either vacuum forming or blow molding. After the pipe has been shaped, it is typically cooled by cooling of the mold blocks. As the pipe continues down the mold tunnel the cooling becomes less and less efficient because the pipe shrinks producing an air gas between the mold blocks and the pipe. Accordingly, the pipe is insulated from and has difficulty in giving heat off to the mold blocks as the pipe continues down the mold tunnel.

SUMMARY OF THE INVENTION

The present invention provides a method and apparatus for molding a plastic product with novel means for cooling of both the mold and the product. The invention is particularly applicable to the molding of a plastic pipe.

According to the method molten plastic is extruded into a mold having an interior face which shapes the product. After the product has been shaped, gas is introduced through an inlet at the interior face of the mold onto the product and cools both the outer surface of the product and the mold. The gas is then discharged out of the mold through an outlet at a location remote from the inlet.

In the case of a plastic pipe, which is formed in a rounded mold tunnel, the cooling gas is introduced through mold block sections on one side of the mold tunnel and is moved circumferentially around the pipe.

The method of the present invention can be used in combination with interior cooling to further increase the cooling effect on the product.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
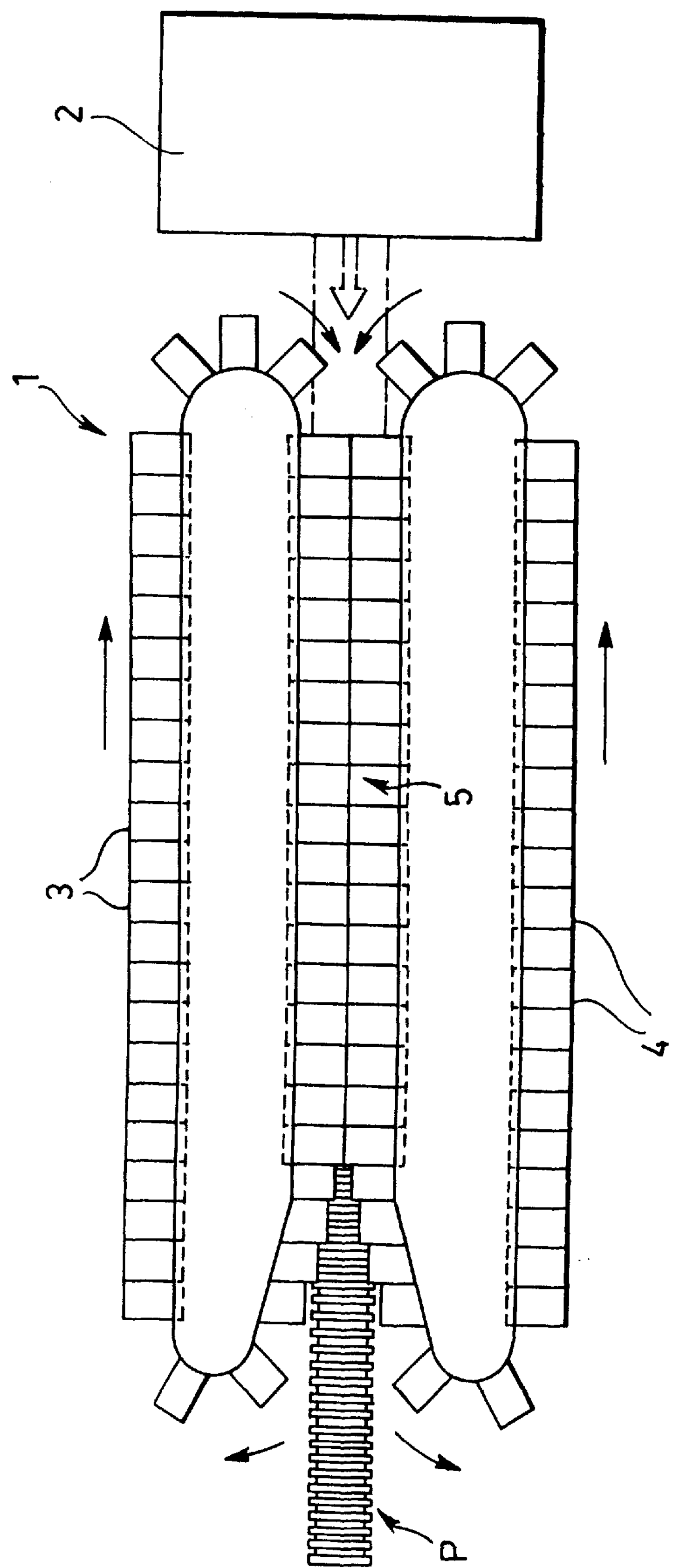
FIG. 1 is a side view of a plastic pipe molding apparatus according to a preferred embodiment of the present invention.

FIG. 1 shows a pipe molding apparatus generally indicated at 1. In this apparatus, molten plastic is fed from an extruder 2 to a mold tunnel downstream of the extruder. Pipe indicated at P emerges from the downstream end of the mold tunnel.

The mold tunnel is formed by an upper track of mold block sections 3 and a lower track of mold block sections 4. The mold block sections meet with one another to define the mold tunnel generally indicated at 5.

Figure 2A:
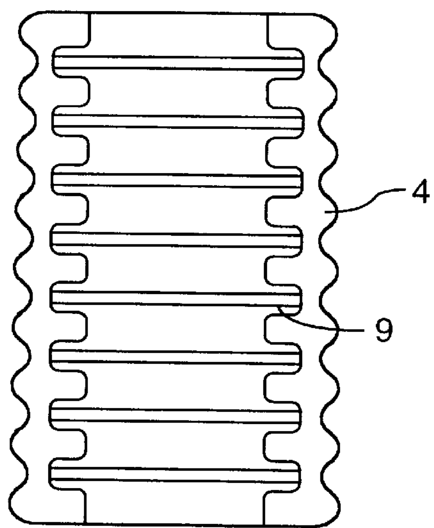
FIG. 2A is a top view of one of the mold block sections of FIG. 2.
Figure 2:
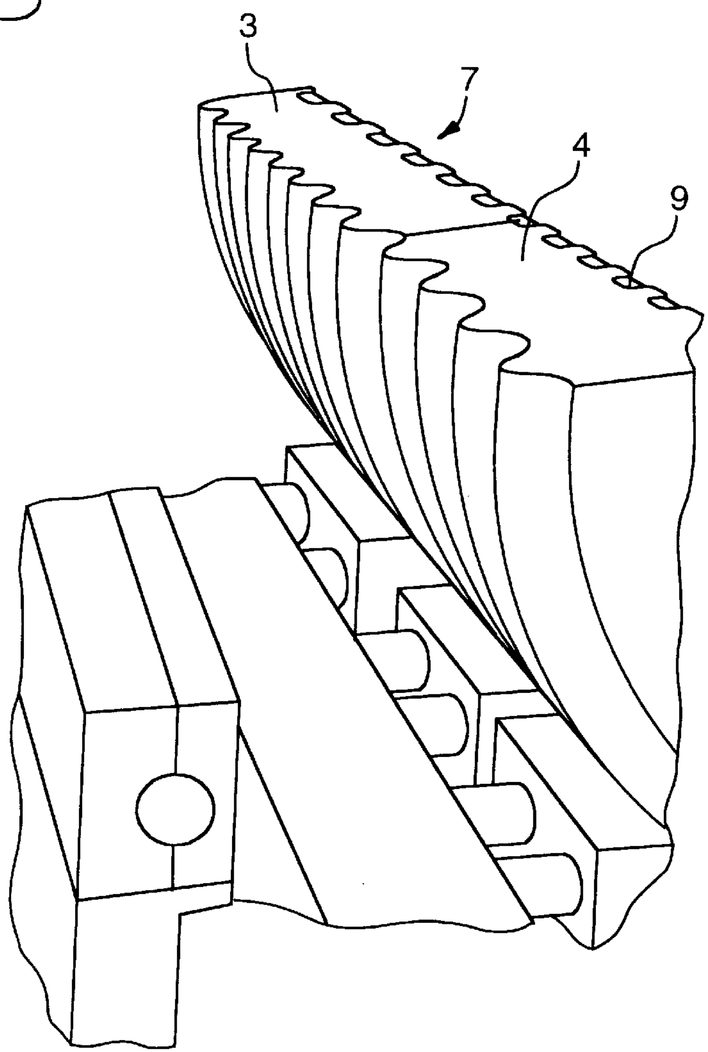
FIG. 2 is a perspective view looking down on a pair of mold block sections from the apparatus of FIG. 1.

FIG. 2 shows a pair of side by side mold block sections 4 from the lower track of mold block sections. As will be seen, these mold block sections have an interior face generally indicated at 7 which defines the external shape of the pipe P. In this particular embodiment, the interior face of the mold block sections has alternating lands and grooves to produce a ribbed shaping of the pipe.

Mold block sections 4 are particularly designed for vacuum forming of the pipe in that they are provided with small vacuum slits 9 at each trough in the mold block face. For vacuum forming of the pipe, suction is drawn through these vacuum slits which pulls the molten plastic onto the faces of the mold block sections. These vacuum slits may be intermittent or they may be continuous around the semi-circular face of each mold block section as shown in FIG. 2A. FIG. 2 shows two slits in each trough of each mold block section, however there may only be one slit or more than the two slits shown for each trough.

Mold block sections 3 in the upper track of mold block sections have an identical construction.

Figure 3:
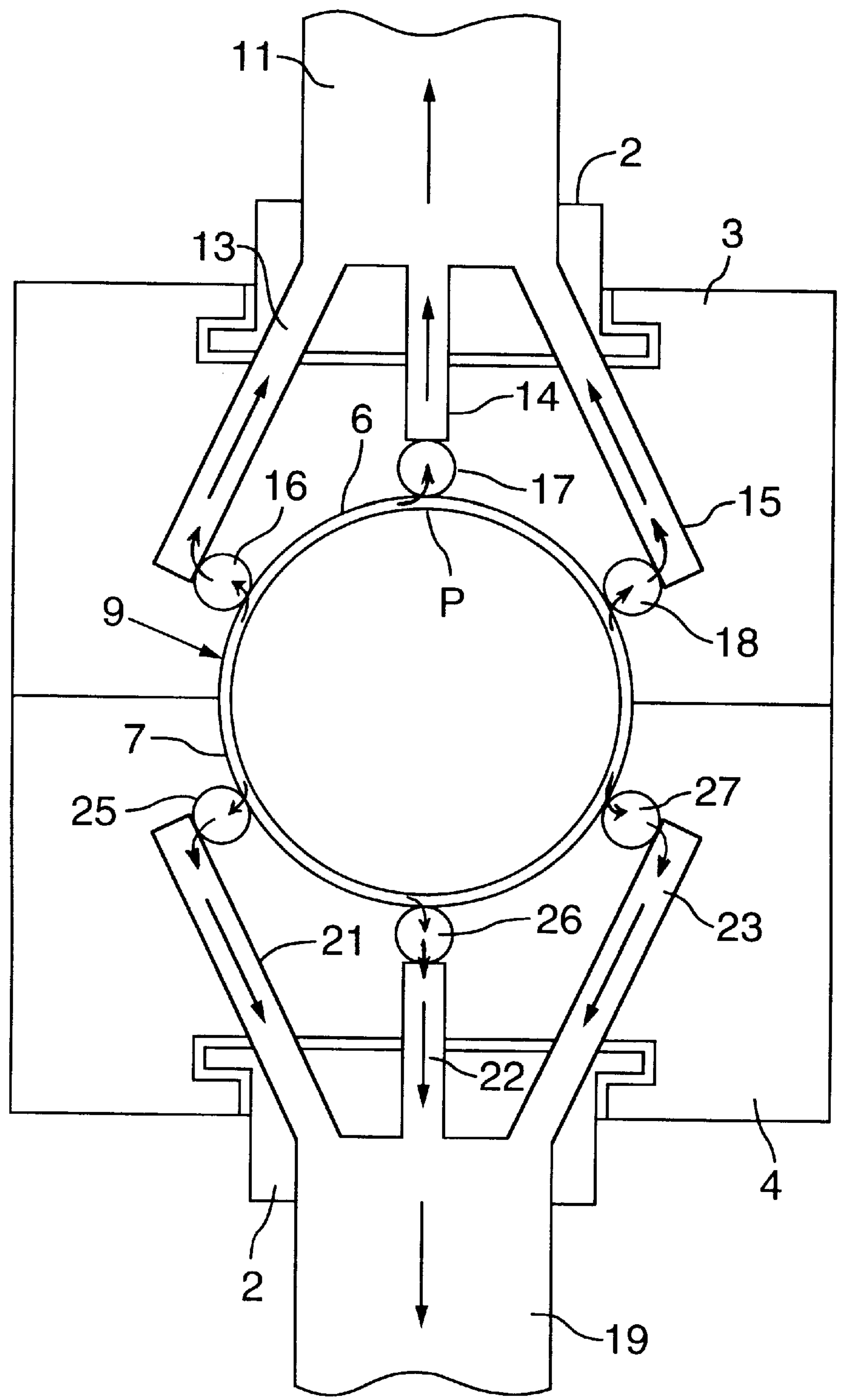
FIG. 3 is a sectional view through the mold tunnel of the apparatus of FIG. 1 showing pipe being vacuum formed according to one preferred embodiment of the present invention.

FIG. 3 shows the vacuum forming of the pipe as it occurs in an upstream region of mold tunnel 5. Here it will be seen that the mold block sections 3 and 4, both of which are mounted to mold block carriers 2, are closed tightly with one another in the mold tunnel. A source of vacuum 11 which as shown in FIG. 3 is located externally of the mold block section is in direct communication with the small slits 9 in the upper mold block section at discrete locations 16, 17 and 18 through passages 13, 14 and 15 respectively. These passages, as shown, go directly through the wall of the upper mold block section. A similar arrangement is found in the lower mold block section 4 where a source of vacuum 19 again outside of the mold tunnel is in connection with the vacuum slits 9 opening at the face of the lower mold block section through passages 21, 22 and 23 having separate access regions 25, 26 and 27 respectively with the vacuum slits.

FIG. 3 shows that when vacuum is applied through both the upper and the lower vacuum source, the plastic is pulled onto the interior surfaces of the two mated mold block sections to shape the pipe P.

Figure 3A:
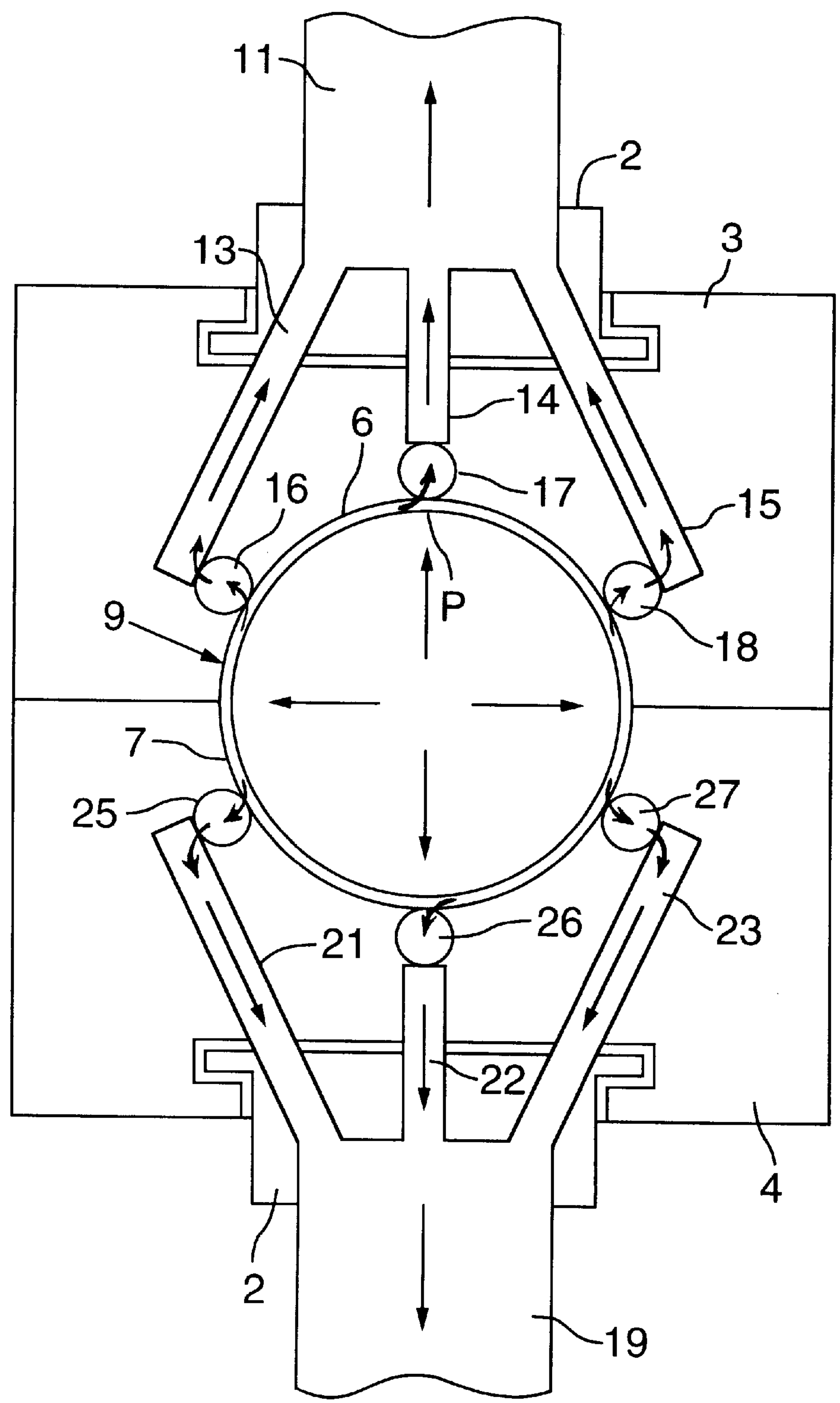
FIG. 3*a* is a sectional view through the mold tunnel of the apparatus of FIG. 1 with the pipe being blow formed according to another preferred embodiment of the present invention.

FIG. 3*a*, while using the same mold block sections 3 and 4 shows that the pipe can also be blow molded from air pressure applied internally of the pipe as shown by the arrows in FIG. 3*a*. This air pressure pushes the molten plastic outwardly onto the mold block faces.

Regardless of the method of forming the pipe, i.e. either by vacuum forming or by blow molding of the pipe, the pipe is cooled using openings in the mold block faces and in this case by using the vacuum slits 9 through the mold block sections. After the pipe has been shaped and as it continues down the mold tunnel where the plastic starts to set to hold the shape of the pipe, a cooling gas is introduced from one of the mold block sections into the mold tunnel and onto the pipe. Eventually, this cooling gas is drawn out of the mold tunnel through an outlet remote from the location where the gas is introduced to the mold tunnel.

Figure 4:
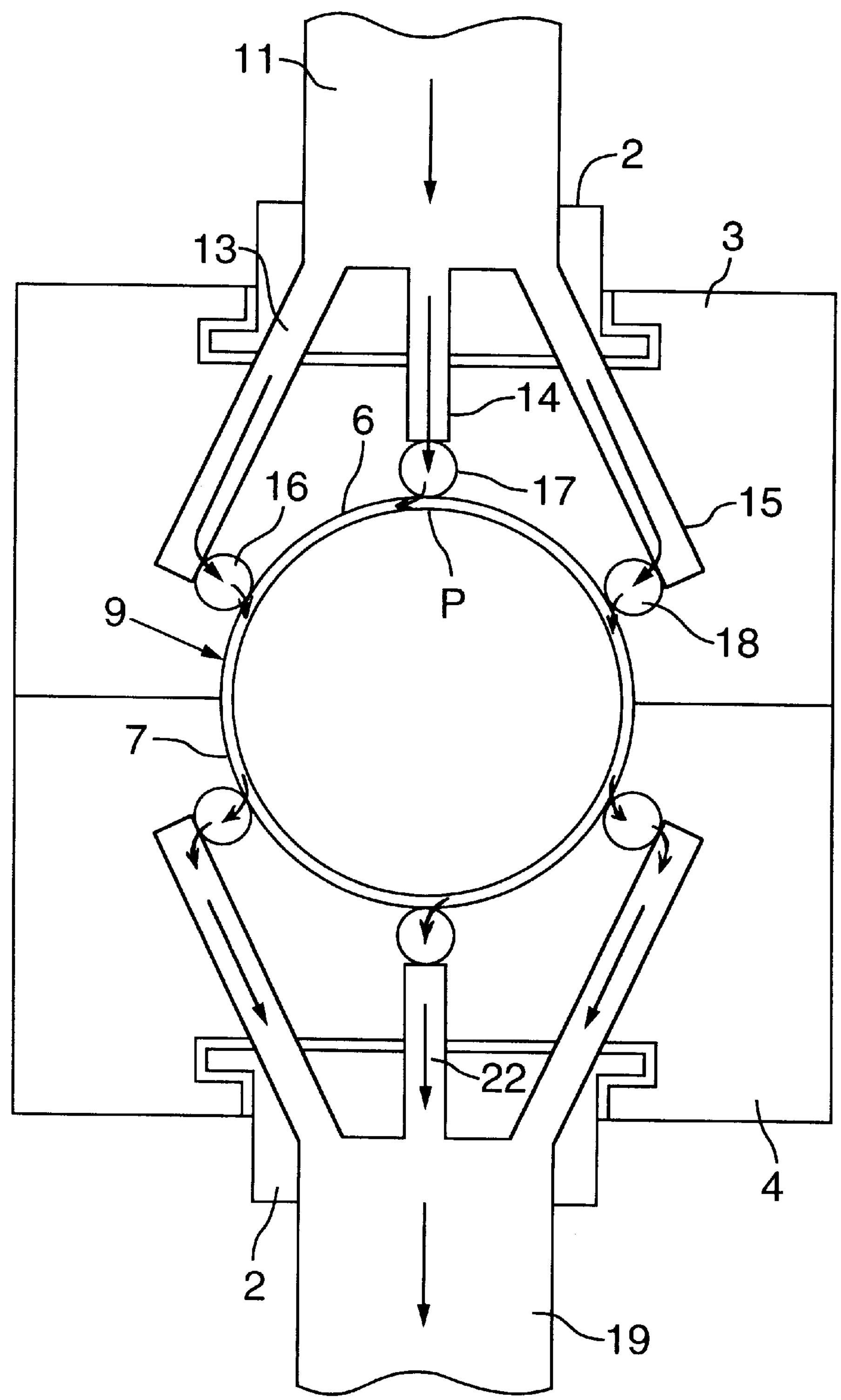
FIG. 4 is a sectional view through the mold tunnel of the apparatus of FIG. 1 showing initial cooling of the pipe.

More particularly, as indicated by the arrows in FIG. 4, cooling gas is introduced to the upper mold block section 3. In the event that the pipe has been vacuum formed, the vacuum while being continued in the upstream region of the mold tunnel is replaced by a flow of cooling gas into the mold tunnel in the more downstream region of the tunnel after the pipe has been shaped and sufficiently set to hold its shape. Passage 11 which now becomes a pathway for the cooling gas. This cooling gas, which may be in a number of different forms including outside ambient air or air which is passed through a cooling device, is forced along the passages 13, 14 and 15 and in this case through the vacuum slits 9 in the upper mold block section. These slits now become inlets into the mold tunnel for directing the cooling gas onto the exterior surface of the pipe P.

Figure 5:
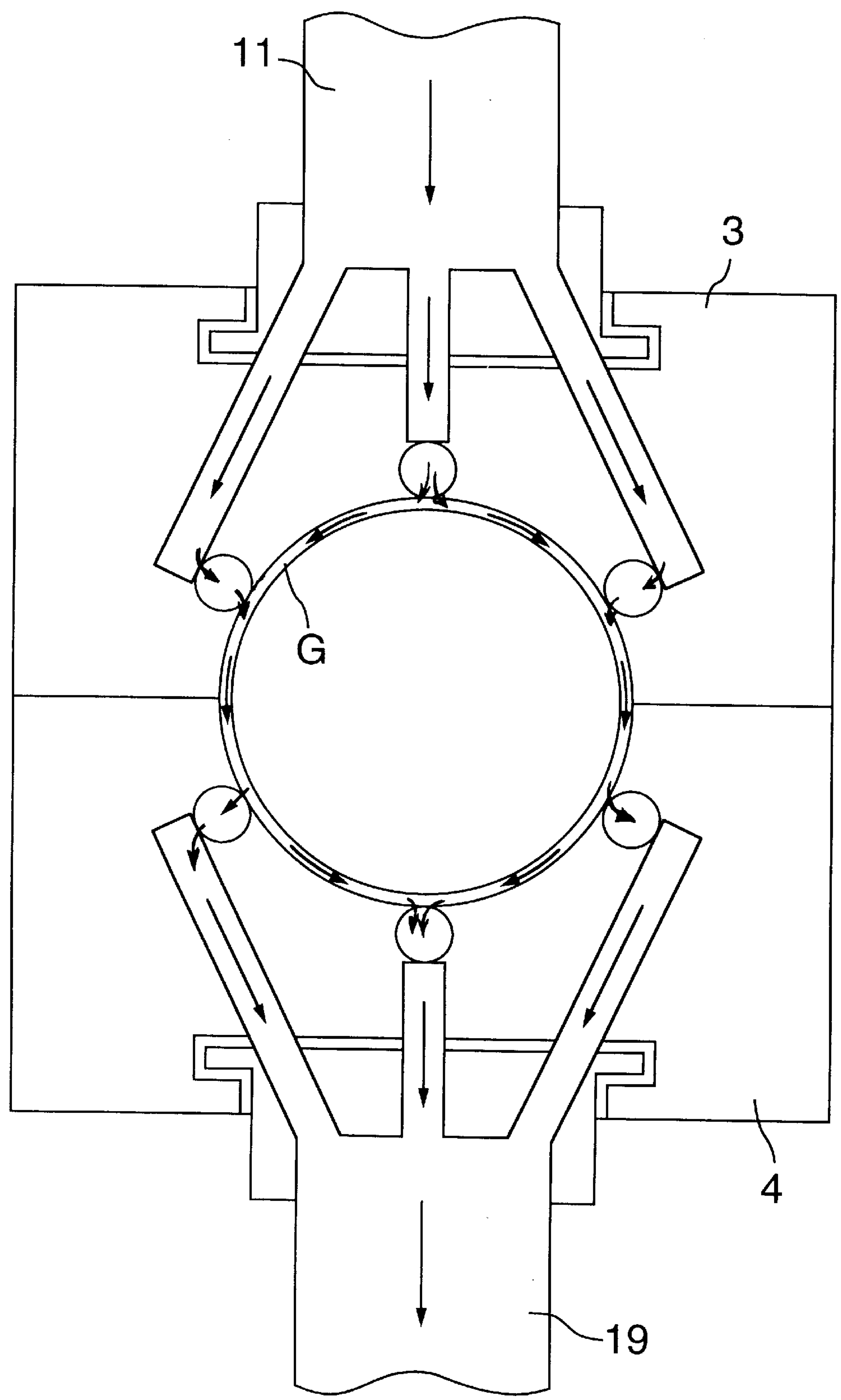
FIG. 5 is a sectional view through the mold tunnel of the apparatus of FIG. 1 showing final cooling of the pipe.

FIG. 5 shows that the pipe, with some initial cooling, shrinks away from the interior surface of the mold sections creating a gap G between the outside surface of the pipe and the interior face of mold tunnel. This allows the cooling gas to be forced circumferentially around the pipe as indicated by the arrows in gap G to the vacuum slits in the lower mold block section where the gas is then drawn out of the mold tunnel. Therefore, the slits in the lower mold block section which continue to be subjected to vacuum, now become gas outlets from the mold tunnel.

It is not necessary to introduce cooling gas to the mold tunnel in order to produce some initial shrinkage of the pipe away from the mold tunnel wall. This occurs naturally as a result of normal cooling of the pipe. Therefore, the cooling gas can be introduced after the natural pipe shrinkage which still produces the gap G allowing the cooling gas to be fed into the mold tunnel from one of the mold block sections and around the pipe to the other mold block section.

The cooling gas has two benefits. Firstly, it provides faster cooling and setting up of the pipe. Secondly, it reduces the temperature of the mold blocks which results in greater ability of the mold blocks to absorb heat from the pipe which again allows the pipe to cool and set faster than normal.

One of the advantages of using the vacuum slits for both the introduction and the discharge of the cooling gas, preferably cooling air, is that the vacuum slits whether they be continuous or intermittent form paths for the cooling air completely through the main body of the mold block sections. Therefore, the cooling air not only runs around and along the interior surfaces of but additionally penetrates into the mold block sections. This substantially enhances cooling the mold block sections. This in turn increases the ability of the mold blocks to cool the pipe particularly after the mold block sections are returned along their endless loops in a much cooler state than normal to the upstream end of the mold tunnel where they are in direct contact with and have the greatest cooling effect on the plastic as it is extruded into the mold tunnel.

Figure 6:
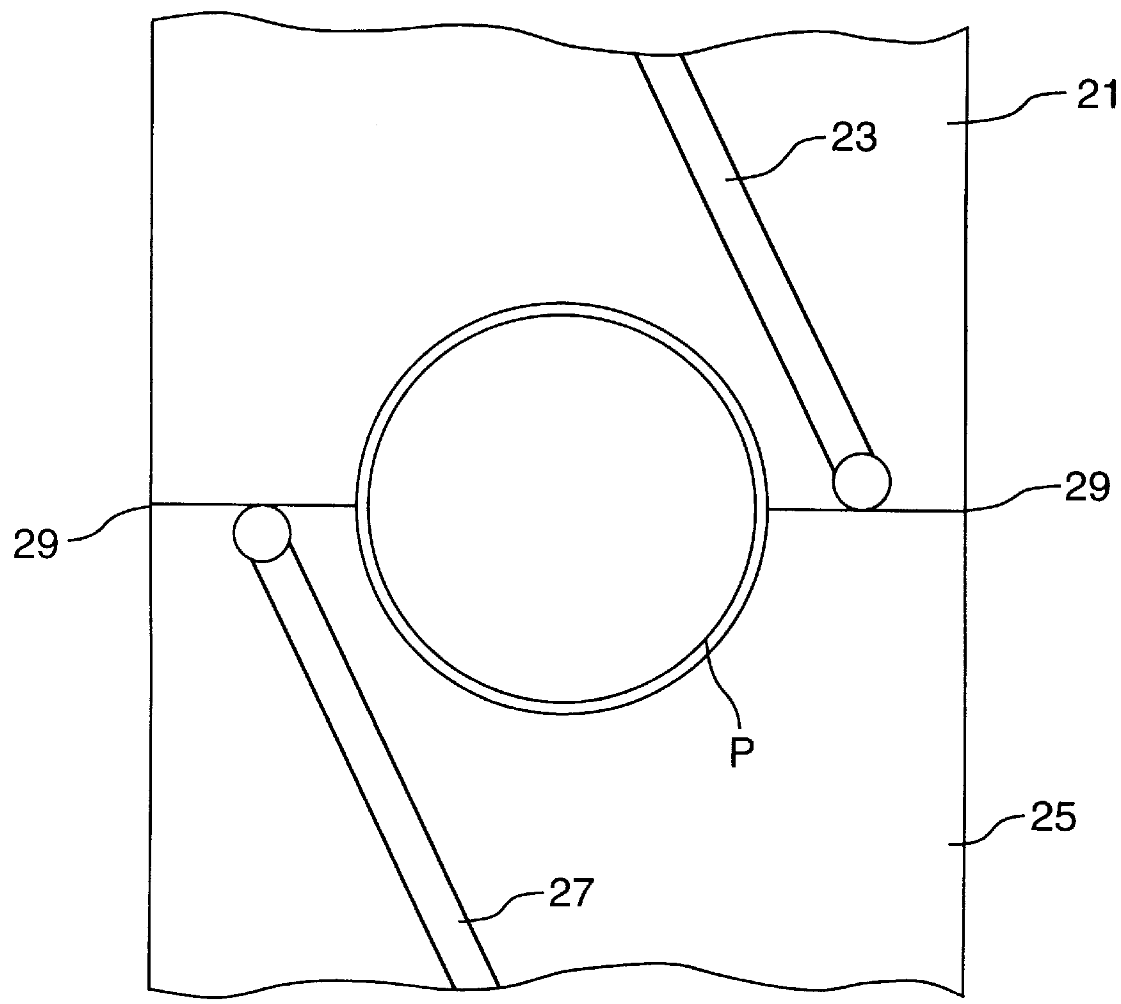
FIG. 6 is a sectional view through a mold tunnel of a further preferred mold apparatus.

FIG. 6 shows a slightly different mold tunnel design comprising a pair of mold block sections 21 and 25 provided with passages 23 and 27 respectively. These passages first provide vacuum paths during formation of the pipe P and later act as cooling gas inlet and outlet passages. They feed into the interior of the mold tunnel along the parting faces of the mold block sections where they meet as indicated at 29 rather than through holes provided directly in the walls of the mold block sections.

If desired, for faster cooling of the pipe in the mold tunnel, a cooling medium such as a cooling plug or even cooling gas can be introduced interiorly of the pipe simultaneously with the exterior cooling of the pipe.

In another embodiment of the invention a cooling gas is introduced at the interior face of the mold tunnel, e.g. through the slits in the mold blocks, along the parting faces of the mold block sections, or through other inlets provided in the mold block faces. After cooling both the product and the mold blocks the gas is discharged through the downstream end of the mold tunnel which is open for releasing the pipe from the mold tunnel as earlier described with respect to FIG. 1 of the drawings.

Although various preferred embodiments of the present invention have been described herein in detail, it will be appreciated by those skilled in the art, that variations may be made thereto without departing from the spirit of the invention or the scope of the appended claims.

What is claimed is:

1. A method of making a plastic product in a mold having a mold region surrounded by a mold wall, the mold having a gas inlet to and a gas outlet from the mold region, the gas inlet being formed through the mold wall and the gas outlet being located away from the gas inlet, the method comprising shaping the product in the mold region against the mold wall, shrinking the product away from the mold wall to produce a gap between the product and the mold wall and then flowing a cooling gas into the mold region at the gas inlet, through the gap where the gas moves over and cools both the product and the mold wall, and then out of the mold region at the gas outlet.

2. A method of making pipe in a mold tunnel formed by first and second mold block sections which mate with one another to form a mold region surrounded by a mold wall having a rounded interior molding surface and an open downstream end where the pipe leaves the mold region, said method comprising shaping the pipe against the molding surface, shrinking the pipe away from the molding surface to produce a, gap between the molding surface and the pipe, passing a cooling gas along a gas inlet extending through the first mold block section to the gap in the mold region and then flowing the cooling gas through the gap along both the pipe and the mold surface to a gas outlet from the mold region which is located remotely of the gas inlet.

3. A method as claimed in claim 2 in which the gas outlet is located in the second mold block section and wherein said method comprises flowing the gas circumferentially within the gap around the mold region along both the pipe and the molding surface from the gas inlet in the first mold block section to the gas outlet in the second mold block section.

4. A method as claimed in claim 2 comprising flowing the cooling gas into the gap in the mold region from the gas inlet in the first mold block section along both the pipe and the molding surface to the open downsteam end of the mold region where the cooling gas passes out of the mold region.

* * * * *